(12) United States Patent
Liu et al.

(10) Patent No.: US 8,139,808 B2
(45) Date of Patent: Mar. 20, 2012

(54) EAR HOOKED EARPHONE

(75) Inventors: Chun-Hsin Liu, Taipei County (TW); Chung-Chun Wu, Taipei (TW); Jui-Chi Liao, Taipei County (TW)

(73) Assignee: Lite-On Technology Corporation, Taipei (TW)

( * ) Notice: Subject to any disclaimer, the term of this patent is extended or adjusted under 35 U.S.C. 154(b) by 1335 days.

(21) Appl. No.: 11/802,703

(22) Filed: May 24, 2007

(65) Prior Publication Data

US 2008/0232632 A1 Sep. 25, 2008

(30) Foreign Application Priority Data

Mar. 23, 2007 (TW) ............................... 96204750 U (51) Int. Cl.
*H04R 25/00* (2006.01)
(52) U.S. Cl. ....................................... 381/381; 381/330
(58) Field of Classification Search .................. 381/381, 381/158, 183, 330
See application file for complete search history.

(56) References Cited

U.S. PATENT DOCUMENTS

| | | | | |
|---|---|---|---|---|
| 5,327,178 A * | 7/1994 | McManigal | ................... | 351/158 |
| 7,110,535 B2 * | 9/2006 | Bodley et al. | ................. | 379/430 |
| 7,313,246 B2 * | 12/2007 | Miller et al. | ................... | 381/381 |
| 7,489,795 B2 * | 2/2009 | Ito | ................................. | 381/381 |
| 7,925,037 B2 * | 4/2011 | Te Riet | ......................... | 381/381 |
| 2003/0235321 A1 * | 12/2003 | Lu | ................................ | 381/381 |

* cited by examiner

*Primary Examiner* — Davetta W Goins
*Assistant Examiner* — Phan Le
(74) *Attorney, Agent, or Firm* — Rosenberg, Klein & Lee (57) ABSTRACT

An ear hooked earphone is provided for selectively being worn on a left or right ear of a user. The earphone includes a body and an ear hook. The body includes a first coupled portion formed on a surface thereof. The ear hook includes a hook section and a fastened section. The hook section is used for hooking around the ear of the user. The fastened section is connected with the hook section, and a separation is formed between ends of the hook section and the fastened section. The fastened section has a second coupled portion, and one of two sides of the second coupled portion is selectively coupled with the first coupled section. Thereby, the position of the separation relative to the body is able to be changed, that is, the ear hooked earphone is able to hang on the left or right ear of the user freely.

14 Claims, 6 Drawing Sheets

EAR HOOKED EARPHONE

CROSS-REFERENCE TO RELATED APPLICATIONS

This non-provisional application claims priority under 35 U.S.C. §119(a) on Patent Application No(s). 096204750 filed in Taiwan, R.O.C. on Mar. 23, 2007, the entire contents of which are hereby incorporated by reference.

BACKGROUND OF THE INVENTION

1. Field of Invention

The present invention relates to an ear hooked earphone. More particularly, the present invention relates to an ear hooked earphone able to be worn on a left or right ear of a user freely.

2. Related Art

An ear hooked earphones has smaller volume compared with that of a circumaural earphone and is superior to insert earphones in terms of good fixing effect. Thus the ear hooked earphone is suitable to be used as a Bluetooth earphone with batteries and wireless transceivers or a headset with a microphone combined with an earphone. The ear hooked earphone includes a body and an ear hook fastened to the body. The ear hook is a curvilinear member fitting a contour of the external ear, and is flexible, so the ear hook can be deformed according to the contour and size of external ear. The curvilinear ear hook has a separation for the external ear of a user to pass through and enter an area surrounded by the ear hook, so as to make the ear hook hooking around on the external ear of the user and further fasten the body on the outer side of external ear of the user.

However, the ear hooked earphones are classified into those provided for the left ear and those for the right-ear. According to habits of common users, the separation of the ear hook is oriented backwards when the wear the ear hooked earphone on, and then moved backwards to wear the ear hook on the external ear. In the conventional ear hooked earphone, the direction of the separation of the ear hook cannot be changed. That is to say, when the ear hooked earphone for the right ear is used for the left ear, the separation will be oriented forwards, which incurs inconvenience to users. Also, under the influence of the contour of the external ear, the fixing effect of the ear hook will become poor, or even the ear hook cannot be worn on the ear.

Accordingly, for the users with different habits (the users used to wear earphones on right ears and the users used to wear earphones on left ear), it is necessary to provide ear hooked earphones for the right ea and ear hooked earphones for the left ear. For manufacturers, more models of products must be provided to meet various requirements of users. For users, it is possible that they buy ear hooked earphones of an undesired model. Therefore, it becomes an issue to be solved that the ear hooked earphone can only be worn on a single-side ear of a user.

SUMMARY OF THE INVENTION

The conventional ear hooked earphone can only fit a single-side ear, and cannot be used for both side ears. In view of the above problem, the object of the present invention is to providing an ear hooked earphone, which can be worn on the right or left ear freely, thereby solving the problems or disadvantages of the prior art.

In order to achieve the object described above, an ear hooked earphone of the present invention is provided for which is able to be selectively worn on a left or right ear of a user. The ear hooked earphone includes a body and an ear hook. The body has a first coupled portion formed on a surface thereof. The ear hook has a hook section and a fastened section. The hook section is used for hooking around one of the right and left ear of the user and the fastened section is connected with the hook section. A separation is formed between an end of the hook section and an end of the fastened section. The fastened section has a second coupled portion having one of the two sides coupled with the first coupled portion to fasten the ear hook to the body. Whereby, the fastened section can be fixed to the body in different directions, and the orientation of the separation can be changed, such that the ear hooked earphone can be worn on the left or right ear of the user freely.

The present invention has the function that the ear hook can be oriented in different directions and fixed to the body with different sides, so that the ear hooked earphone can be worn on the left ear or the right ear. Therefore, the problem existing in the conventional art that the ear hooked earphone can only be worn on a single-side ear is solved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the object, structure, features, and functions of the present invention apparent, the present invention is described in details with reference to the embodiments.

Figure 1:
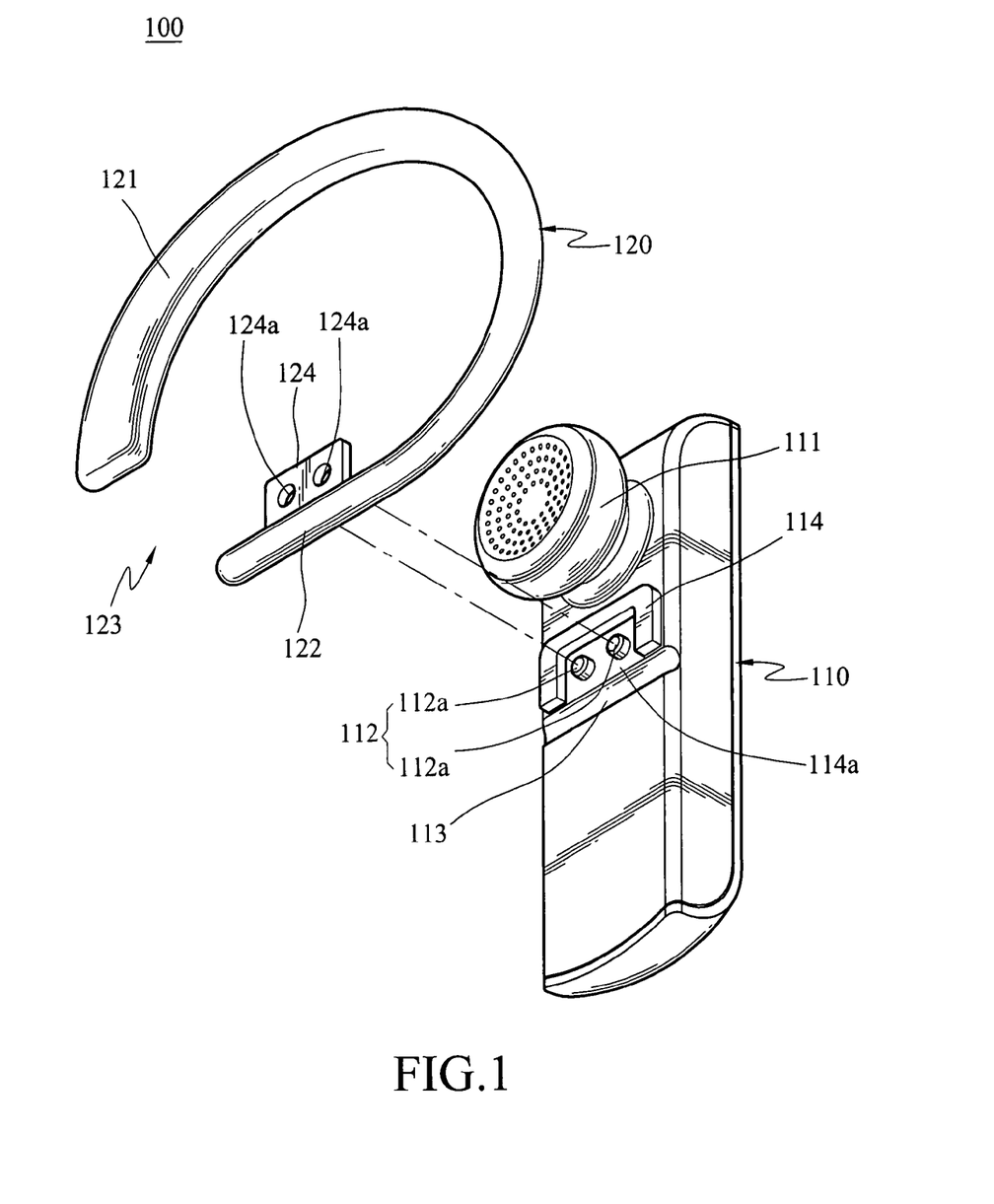
FIG. 1 is an exploded view of a first embodiment of the present invention.
Figures 2, 3:
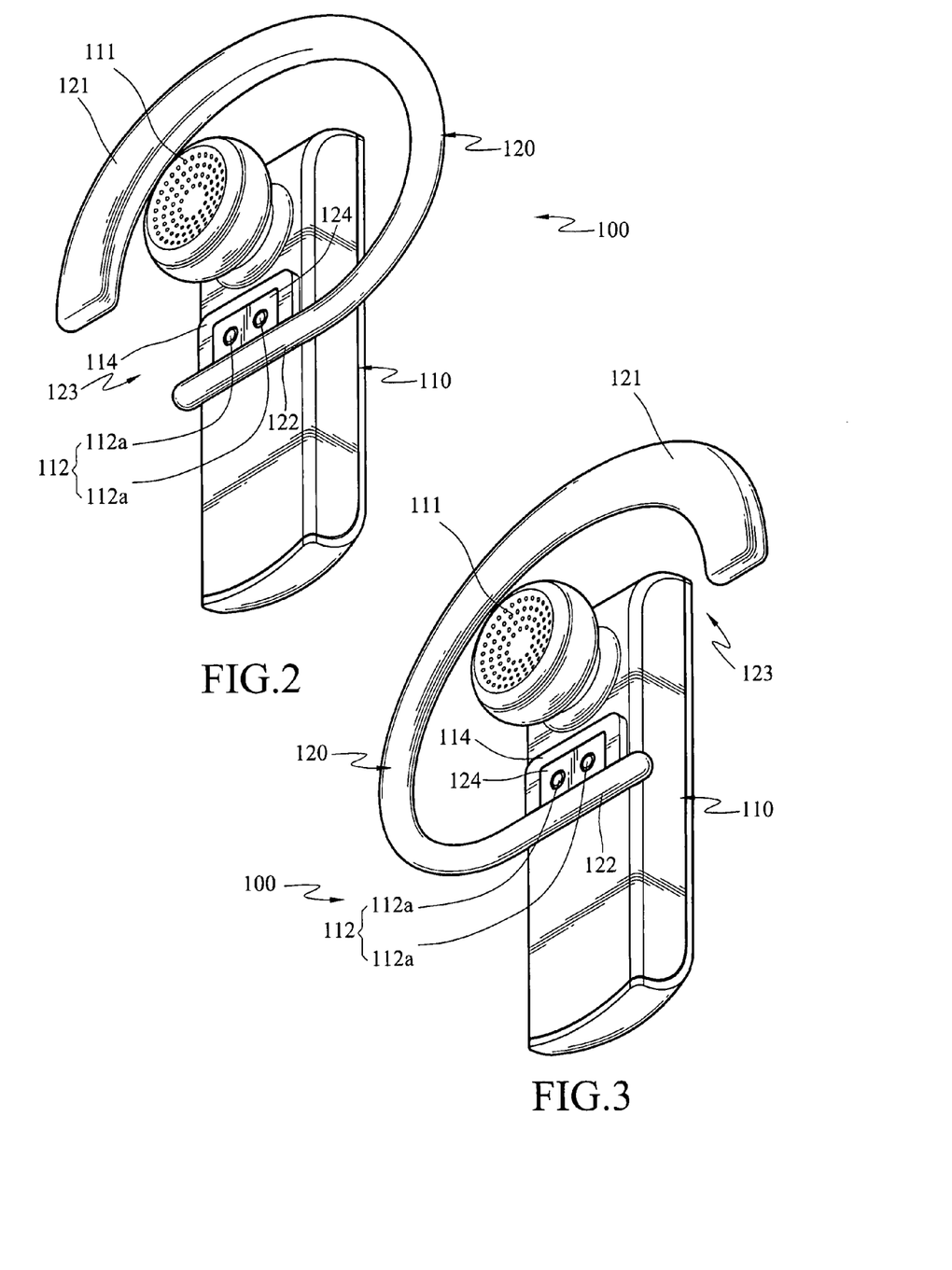
FIG. 2 and FIG. 3 are perspective views of the first embodiment illustrating an ear hook oriented in different directions and fastened to the body.

Referring to FIGS. 1, 2, and 3, an ear hooked earphone 100 according to the first embodiment of the present invention is shown. The ear hooked earphone 100 is provided for being selectively worn on a left or right ear of a user. That is to say, the ear hooked earphone 100 is not specially designed for the left ear or the right ear, such that the user can wear the ear hooked earphone 100 on the left ear or the right ear freely according to the requirements of the user.

Referring to FIG. 1 again, the ear hooked earphone 100 includes a body 110 and an ear hook 120. The ear hook 120 is fastened to the body 110 for hooking around the external ear of the user, so as to fix the body 110 on the user's ear.

The body 110 has a speaker 111 disposed at an end of the body 110. The speaker 111 is an earplug protruding from the body 110 to be inserted into the ear of the user. The body 110 receives and transmits a sound signal to the speaker 111, and the speaker 111 has a speaker element (not shown), disposed inside the speaker 111 to convert the sound signal received by the body 110 into sound. The body 110 can be connected to an electronic device through a signal transmission wire to receive the sound signal. Or, the body 110 can receive the sound signal from an electronic device based through a wireless communication protocol, such as Bluetooth protocol.

The body 110 has a first coupled portion 112, a groove 113, and a weir 114. The first coupled portion 112 includes a plurality of stems 112a formed on the surface of the body 110. The stems 112a are arranged straightly or symmetrically. The groove 113 is formed on the surface of the body 110 and traversing a middle section of the body 110, and the the groove 113 is adjacent to the first coupled portion 112. The weir 114 partially surrounds the first coupled portion 112, so that the first coupled portion 112 is in an embedding trough 114a constructed by the weir 114, and a side of the first coupled portion 112 corresponding to the groove 113 is opened without being surrounded by the weir 114.

The ear hook 120 is a curvilinear member fitting a contour of the external ear and is flexible, such that the ear hook 120 can be deformed according to the contour and size of the external ear. The ear hook 120 has a hook section 121 and a fastened section 122. The hook section 121 is used for hooking around one of the left and right ears of the user, and the fastened section 122 is connected with the hook section 121. A separation 123 is formed between an end of the hook section 121 and an end of the fastened section 122. The separation 123 is oriented to the external ear to allow the external ear to pass through the separation 123 and enter the area surrounded by the ear hook 120, such that the hook section 121 of the ear hook 120 hooks around the external ear.

The fastened section 122 has a second coupled portion 124 which is coupled with the first coupled portion 112. The second coupled portion 124 is a lug extending from the fastened section 122, and the figure of the second coupled portion 124 fits that of the embedding trough 114a constructed by the weir 114 of the body 110. The second coupled portion 124 has one or more through-holes 124a connecting two sides of the second coupled portion 124. The number and arrangement manner of the through-holes 124a depend on the number and arrangement manner of the stems 112a of the first coupled portion 112. Meanwhile, the inner diameter of each through-hole 124a is appreciably smaller than the outer diameter of each stem 112a, such that the stems 112a when inserted in the through-holes 124a can be fixed in the through-holes 124a tightly to couple the second coupled portion 124 with the first coupled portion 112. And the fastened section 122 is embedded in the groove 113 of the body 110, thus the fastened section 122 is fastened to the body 110 through the combination of the second coupled portion 124 and the first coupled portion 112, so that the ear hook 120 is fastened to the body 110. By hooking the ear hook 120 around the user's external ear, the body 110 is fixed to the outer side of the external ear, and the speaker 111 is oriented facing the ear canal and inserted into the user's external ear.

Referring to FIGS. 1, 2, and 3 again, as the through-holes 124a connects the two sides of the second coupled portion 124, the stems 112a of the body 110 can be inserted into the through-holes 124a from any side of the second coupled portion 124. Therefore, the second coupled portion 124 can be placed on the body 110 selectively by one of the two sides, so as to be placed in the embedding trough 114a. That is to say, the second coupled portion 124 has one of the two sides coupled with the first coupled portion 112, so as to fasten the ear hook 120 to the body 110. In this way, the ear hook 120 is fastened to the body 110 with different sides to change the orientation of the separation 123 of the ear hook 120. As the usually moves the ear hooked earphone 100 backwards from the front when wearing the ear hooked earphone 100 on, the separation 123 of the ear hook 120 faces backward. With the movement of the ear hooked earphone 100, the external ear passes through the separation 123 to wear the ear hook 120 on the outer side of the external ear. When it is desired to wear the ear hooked earphone 100 originally worn on the right ear on the left ear, the separation 123 will face forward, and the common user feels uncomfortable when wearing the ear hooked earphone 100, and vice versa. In the first embodiment of the present invention, as the ear hook 120 can be selectively fastened to the body 110 with different sides to change the orientation of the separation 123. FIG. 2 shows the present invention applied to the left ear. The separation 123 is oriented to the left side of the figure. The user when intending to wear the ear hooked earphone 100 on the left ear can make the separation 123 facing backwards, such that the user can easily wear the ear hooked earphone 100. FIG. 3 shows the present invention applied to the right ear. The separation 123 is oriented to the right side of the figure. The user when intending to wear the ear hooked earphone 100 on the right ear can make the separation 123 facing backwards.

Referring to FIG. 4 again, an ear hooked earphone 100 according to the second embodiment of the present invention is shown. The ear hooked earphone 100 includes a body 110 and an ear hook 120. The ear hook 120 is fastened to the body 110 for being worn on the user's ear, so as to fix the body 110 on the user's ear.

Figure 4:
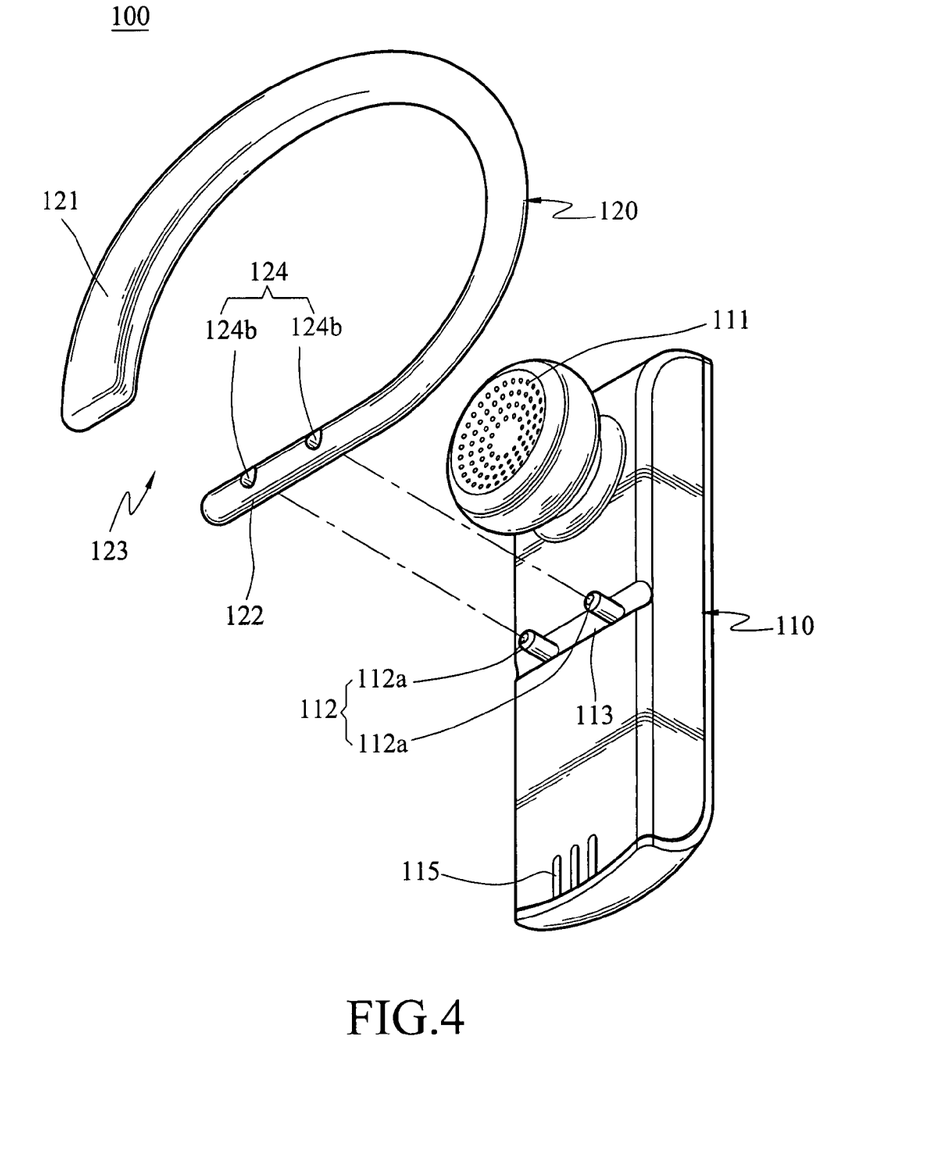
FIG. 4 is an exploded perspective view of a second embodiment of the present invention.

The body 110 has speaker 111 disposed at an end of the body 110 to be placed adjacent to the user's external ear. The body 110 receives and transmits an external sound signal to the speaker 111 to convert the sound signal into a sound. A sound receiving portion 115 is further disposed at another end of the body 110 for receiving and converting the user's sound into a sound signal. Therefore, the ear hooked earphone 100 according to the second embodiment of the present invention integrates the functions of a microphone and an earphone.

The body 110 has a first coupled portion 112 and a groove 113. The groove 113 is formed on the surface of the body 110 and traversing the middle section of the body 110. The first coupled portion 112 includes a plurality of stems 112a formed on the surface of the body 110 and located at the bottom of the groove 113 in a straight arrangement.

The ear hook 120 has a hook section 121 and a fastened section 122 connected to the hook section 121. A separation 123 is formed between an end of the hook section 121 and an end of the fastened section 122. The fastened section 122 has a second coupled portion 124 which has one of the two sides coupled with the first coupled portion 112 selectively. The second coupled portion 124 includes a plurality of through-holes 124b connecting the two sides of the fastened section 122. The number and arrangement manner of the through-holes 124b depend on the number and the arrangement manner of the stems 112a of the first coupled portion 112. The stems 112a of the first coupled portion 112 are used for being inserted into the through-holes 124a and the fastened section 122 is embedded in the groove 113 of the body 110, thereby fastening the fastened section 122 to the body 110.

Figures 5, 6:
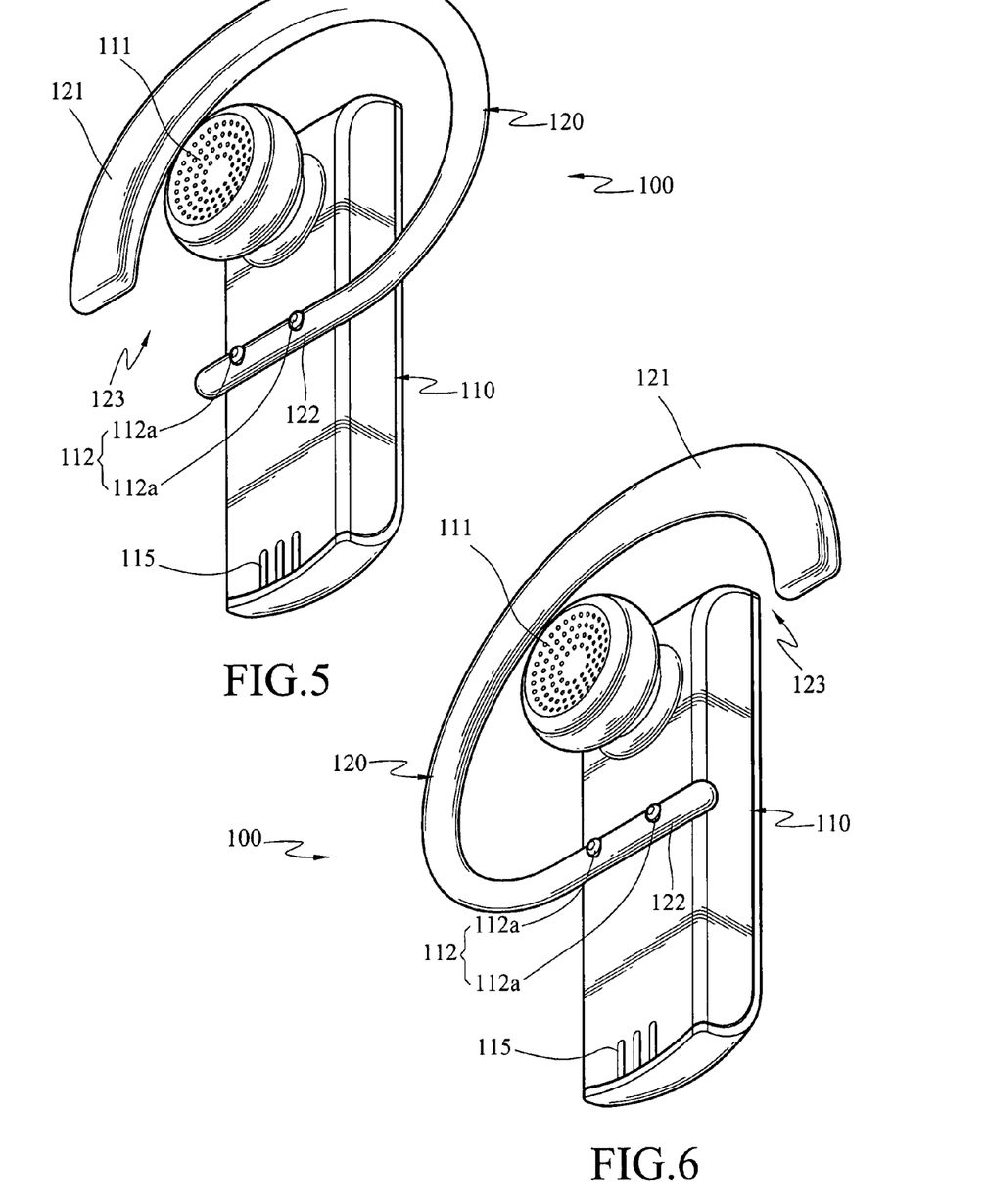
FIG. 5 and FIG. 6 are perspective views of the second embodiment illustrating an ear hook oriented in different directions and fastened to the body.

Referring to FIGS. 4, 5, and 6 again, since the through-holes 124 connect the two sides of the fastened section 122, the stems 112a of the first coupled portion 112 can be selectively inserted into the through-holes 124a from one of the two sides of the fastened section 122, and the fastened section 122 can be disposed adjacent to the body 110 with different sides and embedded in the groove 113. In this way, the second coupled portion 124 has one of the two sides selectively coupled with the first coupled portion 112, so that the ear hook 120 is fastened to the body 110, and the orientation of the separation 123 of the ear hook 120 can be changed.

Figure 7:
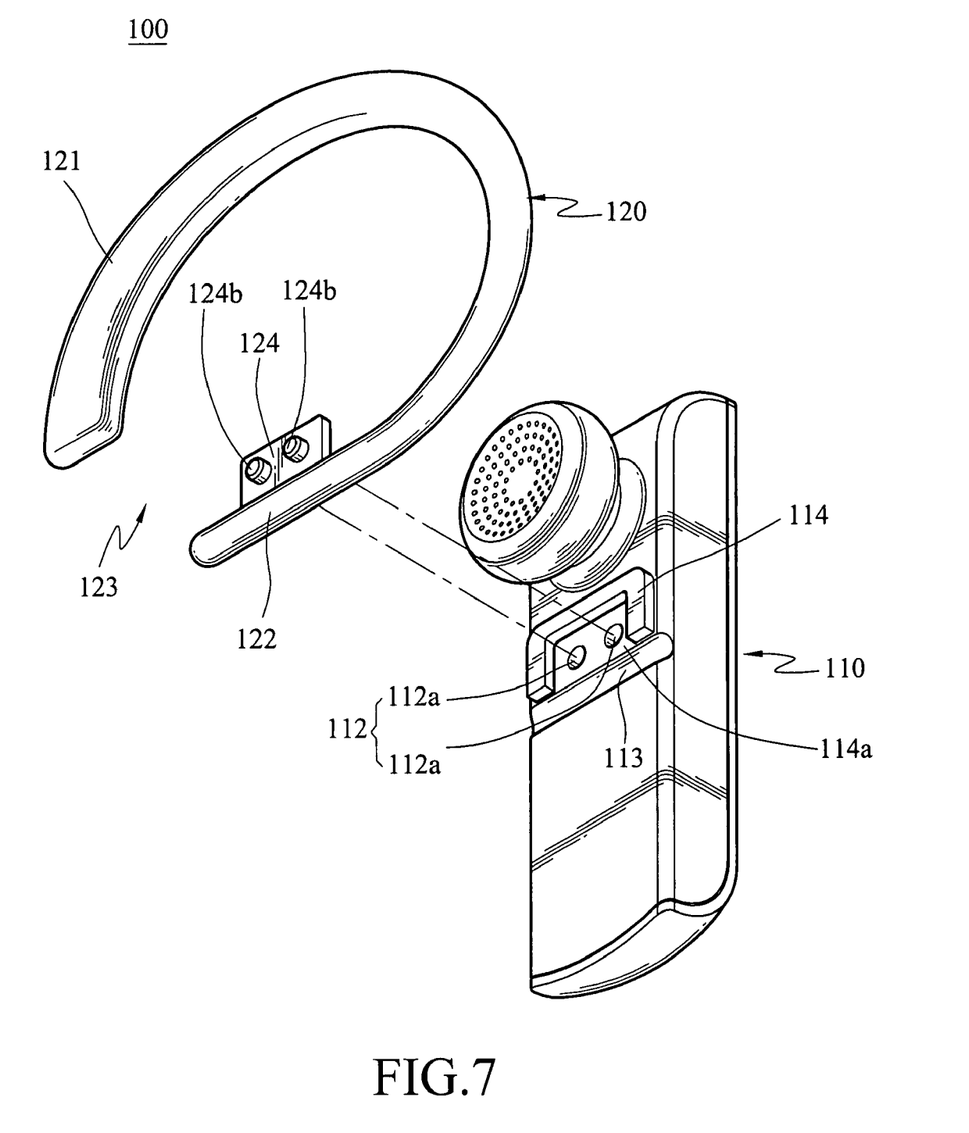
FIG. 7 is an exploded perspective view of a third embodiment of the present invention.

Referring to FIG. 7, an ear hooked earphone 100 according to the third embodiment of the present invention includes a body 110 and an ear hook 120, and the ear hook 120 is fixed to the body 110.

The body 110 has a first coupled portion 112, a groove 113, and a weir 114. The structures of the groove 113 and the weir 114 are identical to those of the first embodiment, and the details will not be described herein again. The first coupled portion 112 includes a plurality of fixing holes 112b formed on the surface of the body 110 and located in the embedding trough 114a constructed by the weir 114 in a straight or symmetrical arrangement.

The ear hook 120 has a hook section 121 and a fastened section 122 connected to the hook section 121, and a separation 123 is formed between an end of the hook section 121 and an end of the fastened section 122. The fastened section 122 has a second coupled portion 124 for being coupled with the first coupled portion 112. The second coupled portion 124 is a lug extending from the fastened section, and further has two or a plurality of fixing posts 124b, which are formed at the two sides of the second coupled portion 124 and extending outward from the two sides of the fastened section 122. The number and arrangement manner of the fixing posts 124b at each side of the second coupled portion 124 depend on the number and arrangement manner of the fixing holes 112b of the first coupled portion 112, so as to be inserted into the corresponding fixing holes 112b, thereby combining the second coupled portion 124 with the first coupled portion 112. The inner diameter of each fixing hole 112b is appreciably smaller than the outer diameter of each fixing post 124b, such that each of the fixing posts 124b is fixed in each of the fixing holes 112b tightly.

Figures 8, 9:
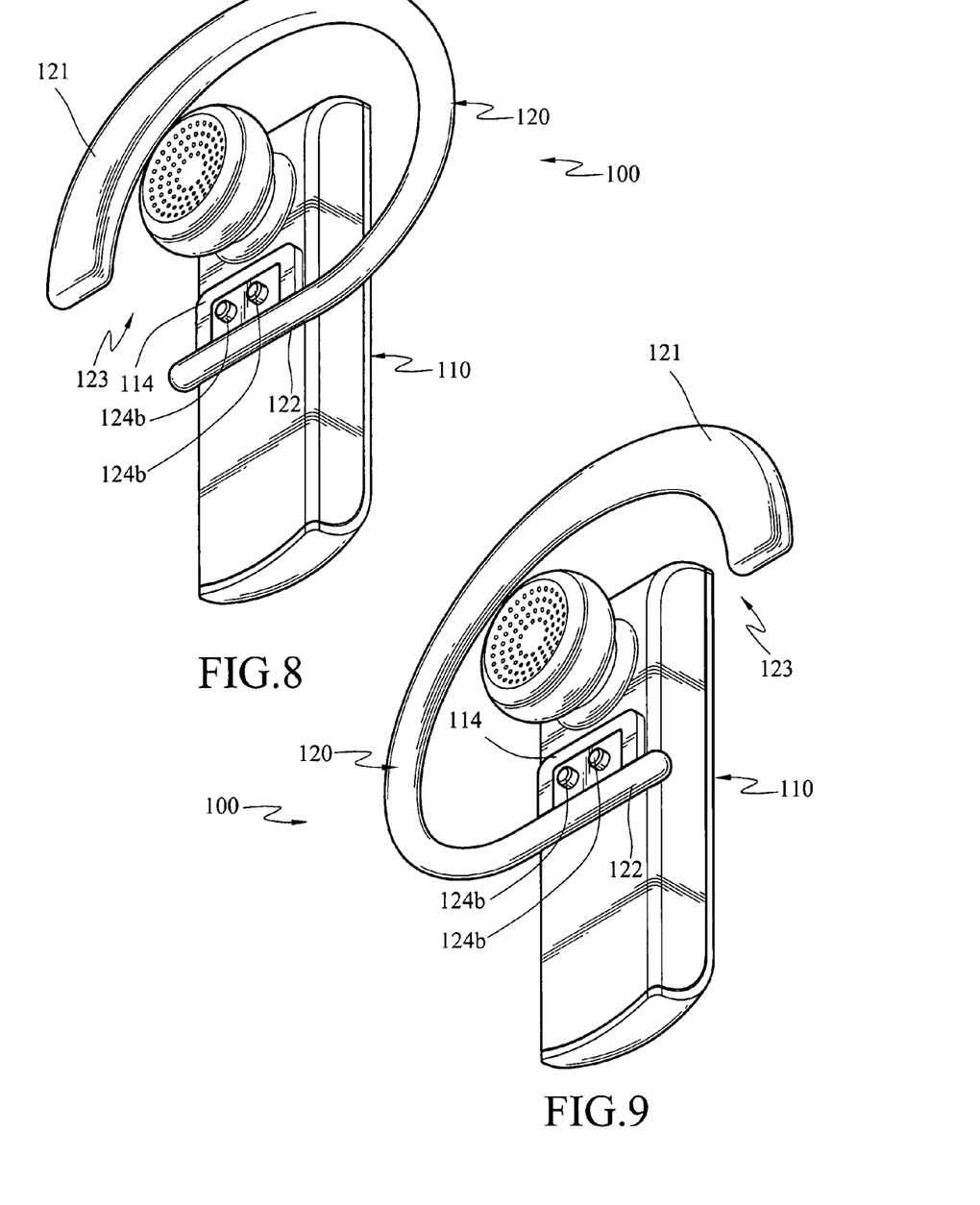
FIG. 8 and FIG. 9 are perspective views of the third embodiment illustrating an ear hook oriented in different directions and fastened to the body.

Referring to FIGS. 7, 8, and 9, as both the two sides of the second coupled portion 124 have fixing posts 124b, the second coupled portion 124 can be disposed adjacent to the body 110 selectively with any side and placed in the embedding trough 114a, thereby embedding the fastened section 122 in the groove 113. Meanwhile, the fixing posts 124b facing the body 110 are also inserted in the fixing holes 112b of the first coupled portion 112, thereby fastening the ear hook 120 to the body 110.

Referring to FIGS. 8 and 9, the ear hook 120 can be selectively inserted in the fixing holes 112b of the first coupled portion 112 selectively through the fixing posts 124 at one of the two sides of the second coupled portion 124, thereby fixing the ear hook 120 to the body 110 at different positions relatively and changing the orientation of the separation 123 of the ear hook 120.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ear hooked earphone, for being selectively worn on a left or right ear of a user, comprising
a body, having
a first coupled portion, formed on a surface of the body; and
a groove formed in the surface of the body and extending throughout a transverse width of the body; and
an ear hook, comprising:
a hook section, for hooking around one of the right or left ear of the user; and
a fastened section, connected with the hook section, wherein a separation is formed between an end of the hook section and an end of the fastened section; and the fastened section has a second coupled portion having one of two sides selectively coupled with the first coupled portion to fasten the ear hook to the body; the fastened section being mounted in the groove when said second coupled portion is coupled to said first coupled portion.

2. The ear hooked earphone as claimed in claim 1, wherein the first coupled portion includes at least one stem formed on a surface of the body, the second coupled portion includes at least one through-hole connecting two sides of the fastened section, and the stem is inserted in the through-hole to fasten the second coupled portion to the first coupled portion.

3. The ear hooked earphone as claimed in claim 2, wherein an inner diameter of the through-hole is smaller than an outer diameter of the stem.

4. The ear hooked earphone as claimed in claim 1, wherein the first coupled portion includes at least one stem formed on the surface of the body, the second coupled portion is a lug extending from the fastened section, and the second coupled portion has at least one through-hole connecting two sides of the second coupled portion, wherein the stems is inserted in the through-hole to fasten the second coupled portion to the first coupled portion.

5. The ear hooked earphone as claimed in claim 4, wherein an inner diameter of the through-hole is smaller than an outer diameter of the stem.

6. The ear hooked earphone as claimed in claim 1, wherein the first coupled portion includes at least one fixing hole formed on the surface of the body, the second coupled portion has at least two fixing posts respectively formed on two sides of the fastened section to be inserted in the fixing hole selectively, so as to fasten the second coupled portion to the first coupled portion.

7. The ear hooked earphone as claimed in claim 6, wherein an inner diameter of the fixing hole is smaller than an outer diameter of the fixing posts.

8. The ear hooked earphone as claimed in claim 6, wherein the second coupled portion is a lug extending from the fastened section, and the two fixing posts are formed on two sides of the lug respectively.

9. The ear hooked earphone as claimed in claim 1, wherein the first coupled portion includes at least one stem formed on the bottom of the groove, the second coupled portion includes at least one through-hole connecting the two sides of the fastened section, and the stem is inserted in the through-hole to fasten the second coupled portion to the first coupled portion.

10. The ear hooked earphone as claimed in claim 1, further comprising a weir partially surrounding the first coupled portion, so that the first coupled portion is locate in an embedding trough constructed by the weir.

11. The ear hooked earphone as claimed in claim 10, wherein the second coupled portion is a lug extending from the fastened section, embedded in the embedding trough, so as to fasten the lug to the first coupled portion.

12. The ear hooked earphone as claimed in claim 1, wherein the body further includes a speaker disposed at an end of the body.

13. The ear hooked earphone as claimed in claim 12, wherein the speaker is an earplug protruding from the body.

14. The ear hooked earphone as claimed in claim 1, wherein the body further comprises a sound receiving portion, disposed at an end of the body for receiving the user's sound.

* * * * *